United States Patent [19]
Jimenez

[11] 3,736,088
[45] May 29, 1973

[54] TOMALE MAKING DEVICE

[76] Inventor: Antonio J. Jimenez, 472 North 13th St., San Jose, Calif. 95112

[22] Filed: July 26, 1972

[21] Appl. No.: 275,228

[52] U.S. Cl. .................. 425/218, 118/506, 206/72, 269/302.1
[51] Int. Cl. ............................................. A21c 3/00
[58] Field of Search .................. 118/500, 506; 248/37.3; 206/72, 1-8; 269/302.1; 264/295; 425/218, 317; 35/37; 32/39

[56] References Cited
UNITED STATES PATENTS

| 1,116,310 | 11/1914 | Maser | 32/39 |
| 2,181,666 | 11/1939 | Molin | 425/218 UX |
| 2,186,335 | 1/1940 | Halpern | 425/218 |
| 2,642,009 | 6/1953 | Orfitelli | 425/218 |
| 3,045,277 | 7/1962 | Carpenter | 99/108 UX |
| 3,131,651 | 5/1964 | Kelner et al. | 118/13 X |

FOREIGN PATENTS OR APPLICATIONS

| 170,437 | 2/1952 | Austria | 32/39 |
| 455,809 | 4/1949 | Canada | 269/302.1 |
| 11,028 | 6/1900 | Great Britain | 269/302.1 |
| 380,407 | 9/1932 | Great Britain | 32/39 |
| 54,442 | 7/1923 | Sweden | 269/302.1 |

Primary Examiner—Morris Kaplan
Attorney—Hubert E. Dubb and Norman E. Reitz

[57] ABSTRACT

A tamale making board has in its top surface a shallow rectangular depression to receive corn husk and a U-shaped trough adjacent and parallel to three sides of said depression. A flat edged spreader blade provides the means to uniformly distribute material placed on said husk and to sweep the excess thereof into said trough. A further portion of said surface provides a general working area.

4 Claims, 4 Drawing Figures

PATENTED MAY 29 1973          3,736,088
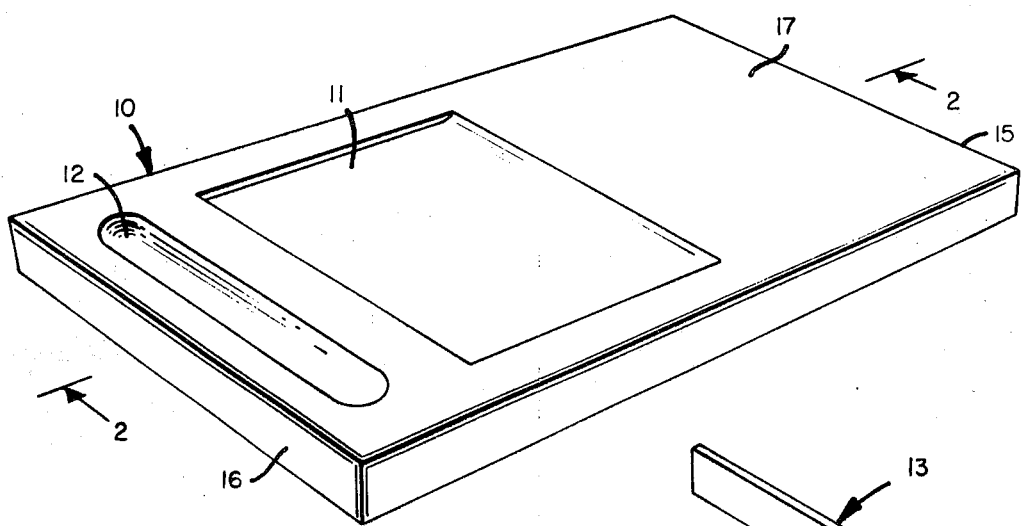
FIG. 1
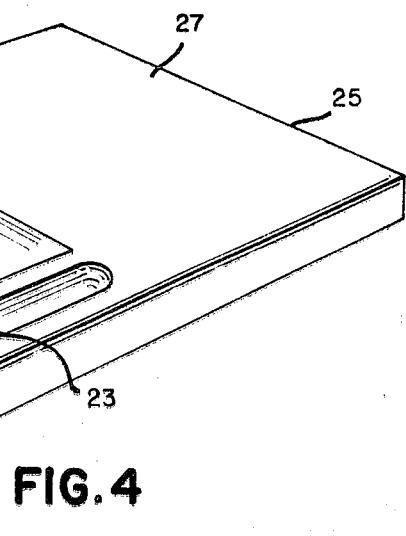
FIG. 3
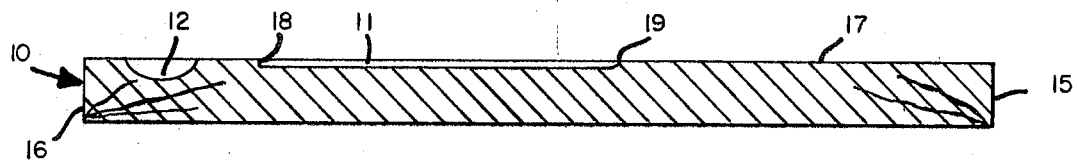
FIG. 2
FIG. 4

TOMALE MAKING DEVICE

BACKGROUND

The invention relates to a device useful in the preparation of tamales. This device is particularly useful for home preparation of tamales wherein sophisticated tamale manufacturing equipment is not available.

It has been the practice when preparing tamales to place a corn husk layed out flatly upon one hand, to spread wet masa (cornmeal) upon the corn husk using the other hand to accomplish the spreading, to then add a meat based filler atop the masa and corn husk combination and then to roll the tamale into a roughly cylindrical shape.

The above described prior art procedure has a number of problems inherent therein. Firstly, it is difficult to obtain an even coating of wet masa upon the corn husk. Secondly, the process is not thoroughly hygienic unless the tamale makers hands have been very thoroughly cleaned before starting the tamale making process. Thirdly, the hands of the tamale maker quickly become coated with masa and generally the meat filler. This is not only unpleasant for the tamale maker but also is time consumming since if the tamale maker is to be able to roll up the corn husk-masa-meat filler combination in a proper manner it becomes necessary for the tamale maker to frequently wash his or her hands. Also, the above procedure is relatively slow.

For the above reasons it would be highly desirable to have available a device useful in the preparation of tamales, which device eliminated the above set out problems.

Accordingly, it is an object of the present invention to provide a device useful in the preparation of tamales, which device can be easily put in a hygienic condition.

It is another object of the invention to provide a device useful in the preparation of tamales which during use allows the tamale makers hands to stay relatively free of wet masa and/or meat filler.

It is a further object of the invention to provide a device useful in the preparation of tamales which will allow the production of more tamales per unit of time.

It is a still further object of the invention to provide a device useful in the preparation of tamales which will prepare tamales having a more uniform and even thickness of masa between the corn husk and the meat filler.

It is a further object yet of the invention to provide a device for quickly preparing tamales in the home or restaurant kitchen which utilizes the hygienic tamale making device of the present invention.

SUMMARY OF THE INVENTION

The invention comprises a device useful in the preparation of tamales, comprising a substantially flat board having a front trough adjacent and substantially parallel to the front end thereof and a rectangular depression adapted to hold a corn husk, one side of said depression being located adjacent said front trough and towards the rear of said board from said front trough, the side of said rectangular depression adjacent said front trough being substantially parallel to said front trough.

The invention further comprises means by which to practice a process for preparing a tamale, comprising: (1) substantially evenly spreading wet masa upon a corn husk positioned in the depression of the device described in the previous paragraph; (2) collecting excess wet masa, if any, in the trough of said device; (3) adding a meat based filler atop said spread wet masa; and (4) rolling up said corn husk about said wet masa and said meat filler to form a substantially cylindrically shaped food product.

BRIEF DESCRIPTION OF THE DRAWING

For better comprehension of the tamale making device of the present invention may be had to the drawing which is incorporated herein and in which:

FIG. 1 is a perspective view of one embodiment of the present invention;

FIG. 2 is a side section view taken along the line 2—2 of FIG. 1;

FIG. 3 is a perspective view of a spreader useful in combination with the device of FIG. 1 and/or the device of FIG. 4;

FIG. 4 is a perspective view of a second embodiment of the device of the present invention illustrating in particular a trough which extends on three sides of the depression adapted to hold a corn husk.

DESCRIPTION OF THE PREFERRED EMBODIMENTS

By reference to FIG. 1 it can be seen that the device of the present invention, is a relatively simple device. A board 10, having a depression 11 therein which is substantially rectangular in shape and is adapted to hold a corn husk spread in the bottom of said depression, and a trough 12 positioned between the depression and the front end 16 of the board 10, constitute the device. The device also includes a working area 17 between the depression 11 and the back end of the board 15.

By reference to FIG. 2 which is a side section view along the line 2—2 of FIG. 1 one can see the board 10, the trough 12, and the depression 11. FIG. 2 also illustrates that in the preferred embodiment the depth of the front edge 18 of the depression 11 is substantially equal to the depth near the rear 19 of the depression 11. Thus the depression 11 is illustrated as being substantially uniform in depth throughout.

FIG. 3 illustrates a substantially flat edged spreader blade 13 which is useful in the practice of the present invention. One edge of the flat edge spreader blade, for example edge 14, is useful in spreading wet masa upon a corn husk placed in the depression 11.

FIG. 4 is similar to FIG. 1 and illustrates a second preferred embodiment of the invention. In this embodiment a board 20 having a depression 21 adapted to hold a corn husk also has a trough 22 between the depression 21 and the front edge 26 of the board 20. The trough 22 is contiguous with the two side troughs 23. The combination of troughs 23-22-23 thus provides a U-shaped trough surrounding three sides of the depression 21. As is shown in FIG. 4 the two side troughs 23 are each adjacent a different side of the board 20 and are between the depression 21 and said different side. Each of the side troughs 23 is contiguous with the front trough 22 and is substantially perpendicular thereto at the opposite ends thereof. The embodiment of the invention illustrated in FIG. 4 also provides a working surface 27 between the depression 21 and the back 25 of the board 20.

For simplicity, the method of use of the device of the present invention will be described with respect to the first embodiment although it would be obvious that this same method would be useful with any embodiment of the present invention.

In use, referring to FIGS. 1, 2, and 3, a corn husk is positioned in the depression 11. Wet masa is placed upon the corn husk and is then spread substantially evenly thereon preferably using a spreader such as 13. The edge 14 of the spreader 13 can, for example, be used to spread the wet masa upon the corn husk. A meat based filler is then added upon the corn husk and the corn husk and wet masa are rolled up around the filler to form a roughly cylindrical tamale.

During the spreading of the wet masa upon the corn husk it may be found that too much masa has been used. In this case, the excess masa is scraped off of the top of the corn husk by the edge 14 of the spreader 13 and propelled into the trough 12. This excess masa may then be recycled for making additional tamales.

It is evident that the masa will be spread to a substantially even thickness upon the corn husk by the method of the present invention, the thickness of the masa being equal to the depth to the depression 11 minus the thickness of the corn husk. Generally it is preferred that the depth of the depression 11 be between one-sixteenth of an inch and one-fourth of an inch, one-eighth of an inch having been found to be best.

The device of the present invention is, of course, useful in itself but when used in combination with a flat edged spreader blade as illustrated in FIG. 3 the resulting combination has been found to be especially useful and convenient to use.

The board used in the present invention may be made of any suitable material although a hard cellulosic material is preferred and, more particularly, wood is preferred. A hard wood such as oak has been found to be very useful for preparing tamale making boards according to the present invention. Hard wood can be easily and thoroughly cleaned to provide a hygienic working surface.

DESCRIPTION OF THE PROCESS

The process utilizing the device of the present invention is considerably quicker than the prior art hand method of tamale preparation. This process comprises substantially evenly spreading wet masa upon a corn husk positioned in the depression of the device of the present invention; collecting excess wet masa, if any, in the trough of said device; adding a meat based filled atop said wet masa; and rolling up said corn husk about said wet masa and said meat filler to form a substantially cylindrically food product. In a preferred embodiment of the process, the excess masa, if any, collected in the trough is recycled and used in preparing additional tamales.

It is further preferred in practicing the process utilizing the device of the present invention that the substantially even spreading is accomplished using a substantially flat edged spreader. Further, when using a substantially flat edged spreader it is generally desirable to spread the wet masa upon the corn husk while holding the spreader in a position whereby the edge of the spreader which contacts the wet masa forms an angle in the direction the spreader is being moved of less than 90° with the tamale making board. Spoons or the like can be used to transfer the masa and/or the filler thereby keeping the hands of the tamale maker cleaner.

The recipe used for providing the meat based filler is not relevant to the process of the present invention, but is instead a matter of choice. Tamale filler recipes are well known and vary greatly from cook to cook. Thus, the composition of the meat filler does not in any way form a part of the present invention.

In the preferred embodiment of FIG. 1, the board is preferably about 8 inches along the front by about 12 inches along the sides. In the preferred embodiment of FIG. 4, the board is preferably about 12 inches along the front by about 14 inches along the side. The preferred size of the depression is about 6 inches parallel to the front of the board by about 6¼ inches to 6½ inches parallel to the side of the board. The end of the depression closest the back of the board preferably slopes gently upwardly to meet the surface of the board. The troughs are preferably about one-fourth inch deep and may be rounded or flat on the bottom.

While the invention has been described in connection with specific embodiment thereof, it will be understood that it is capable of further modification, and this application is intended to cover any variations, uses or adaptations of the invention following, in general, the principles of the invention and including such departures from the present disclosure as come within known customary practice in the art to which the invention pertains and as may be applied to the essential features hereinbefore set forth, and as fall within the scope of the invention and the limits of the appended claims.

I claim:

1. A combination useful for preparing a tamale comprising:
   a substantially flat edged spreader blade;
   a substantially flat board having a rectangular depression in the top surface thereof adapted to hold corn husk;
   a second depression in said surface forming a U-shaped trough which is parallel to and coextensive with a transverse edge and the side edges of said depression;
   a remaining portion of said surface comprising a working area;
   the rectangular depression being of a generally uniform shallow depth; and
   the spreader blade of a longitudinal size to be operatively associated with said depression whereby material placed on said corn husk may be uniformly distributed and the excess thereof collected in said trough.

2. A device as in claim 1 wherein said board is formulated of a hard cellulosic material.

3. A device as in claim 2, wherein said material is wood.

4. A device as in claim 1, wherein the depth of said rectangular depression is between one-sixteenth inch and one-fourth inch.

* * * * *